US011508399B2

United States Patent
Maeto

(10) Patent No.: US 11,508,399 B2
(45) Date of Patent: Nov. 22, 2022

(54) MAGNETIC DISK DEVICE AND READ/WRITE PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Nobuhiro Maeto, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/407,893

(22) Filed: Aug. 20, 2021

(65) Prior Publication Data

US 2022/0293129 A1    Sep. 15, 2022

(30) Foreign Application Priority Data

Mar. 15, 2021 (JP) .............................. JP2021-041234

(51) Int. Cl.
  *G11B 20/12* (2006.01)
  *G11B 20/18* (2006.01)
  *G11B 5/012* (2006.01)

(52) U.S. Cl.
  CPC .............. *G11B 5/012* (2013.01); *G11B 20/18* (2013.01)

(58) Field of Classification Search
  CPC .......... G11B 20/18; G11B 5/09; G11B 27/36; G11B 5/00; G11B 5/54; G11B 5/59633; G11B 5/59638; G11B 20/12; G11B 5/012
  USPC ........................................................... 360/53
  See application file for complete search history.

(56) References Cited

U.S. PATENT DOCUMENTS

| 8,683,295 B1 * | 3/2014 | Syu ..................... G11B 20/1833 714/763 |
| 8,699,162 B1 | 4/2014 | Grobis et al. |
| 10,049,698 B2 | 8/2018 | Zhu et al. |
| 10,777,227 B2 | 9/2020 | Kashiwagi et al. |
| 2019/0198054 A1 * | 6/2019 | Isokawa ............. G11B 20/1037 |

* cited by examiner

*Primary Examiner* — Nabil Z Hindi
(74) *Attorney, Agent, or Firm* — Allen & Overy LLP

(57) ABSTRACT

According to one embodiment, a magnetic disk device includes a disk, a head, and a controller setting a rewrite threshold value for executing a rewrite process of different tracks in a first sector group including at least one first sector continuous from a first parity sector in which error correction processing in units of tracks is executable based on the first parity sector and including the first parity sector, and a second sector group including at least one second sector continuous in which the error correction processing in units of tracks is unexecutable, and rewriting the first sector group and the second sector group with different frequencies.

18 Claims, 7 Drawing Sheets

F.I.G. 1

MAGNETIC DISK DEVICE AND READ/WRITE PROCESSING METHOD

CROSS-REFERENCE TO RELATED APPLICATIONS

This application is based upon and claims the benefit of priority from Japanese Patent Application No. 2021-041234, filed Mar. 15, 2021, the entire contents of which are incorporated herein by reference.

FIELD

Embodiments described herein relate generally to a magnetic disk device and a read/write processing method.

BACKGROUND

A magnetic disk device can comprise an error correction function of correcting a sector based on a parity sector corresponding to a track including this sector when this sector cannot be corrected (rescued or recovered) by a correction code corresponding to this sector. The magnetic disk device writes a result of an exclusive OR (XOR) operation on each sector of a particular track as a parity sector to this track. When detecting an error in a particular sector of this track, the magnetic disk device executes error correction processing (hereinafter often referred to as track ECC processing) of correcting the error using an error correction code based on the parity sector corresponding to this track. When the magnetic disk device randomly overwrites data in the conventional magnetic recording (CMR) format on a part of the track including the parity sector, the magnetic disk device may not be able to execute the track ECC processing on this track.

In addition, in the magnetic disk device, when data is written, side erase that the data is erased may occur due to the influence of magnetic flux leakage from the head or the like (adjacent track interference: ATI). The ATI is varied depending on, for example, the characteristics of the head, a track per inch (TPI) setting value, a write current setting value, and the like. In order to prevent the side erase, the magnetic disk device comprises a function of rewriting data on the particular track (refresh function) when the number of times of writing data to surrounding tracks of the particular track reaches a specified number.

DETAILED DESCRIPTION

In general, according to one embodiment, a magnetic disk device comprises: a disk; a head writing data to the disk and reading data from the disk; and a controller setting a rewrite threshold value for executing a rewrite process of different tracks in a first sector group including at least one first sector continuous in a circumferential direction of the disk from a first parity sector in which error correction processing in units of tracks is executable based on the first parity sector and including the first parity sector, and a second sector group including at least one second sector continuous in the circumferential direction in which the error correction processing in units of tracks is unexecutable, and rewriting the first sector group and the second sector group with different frequencies.

Embodiments will be described hereinafter with reference to the accompanying drawings. The drawings are only examples and do not limit the scope of the invention.

EMBODIMENTS

Figure 1:
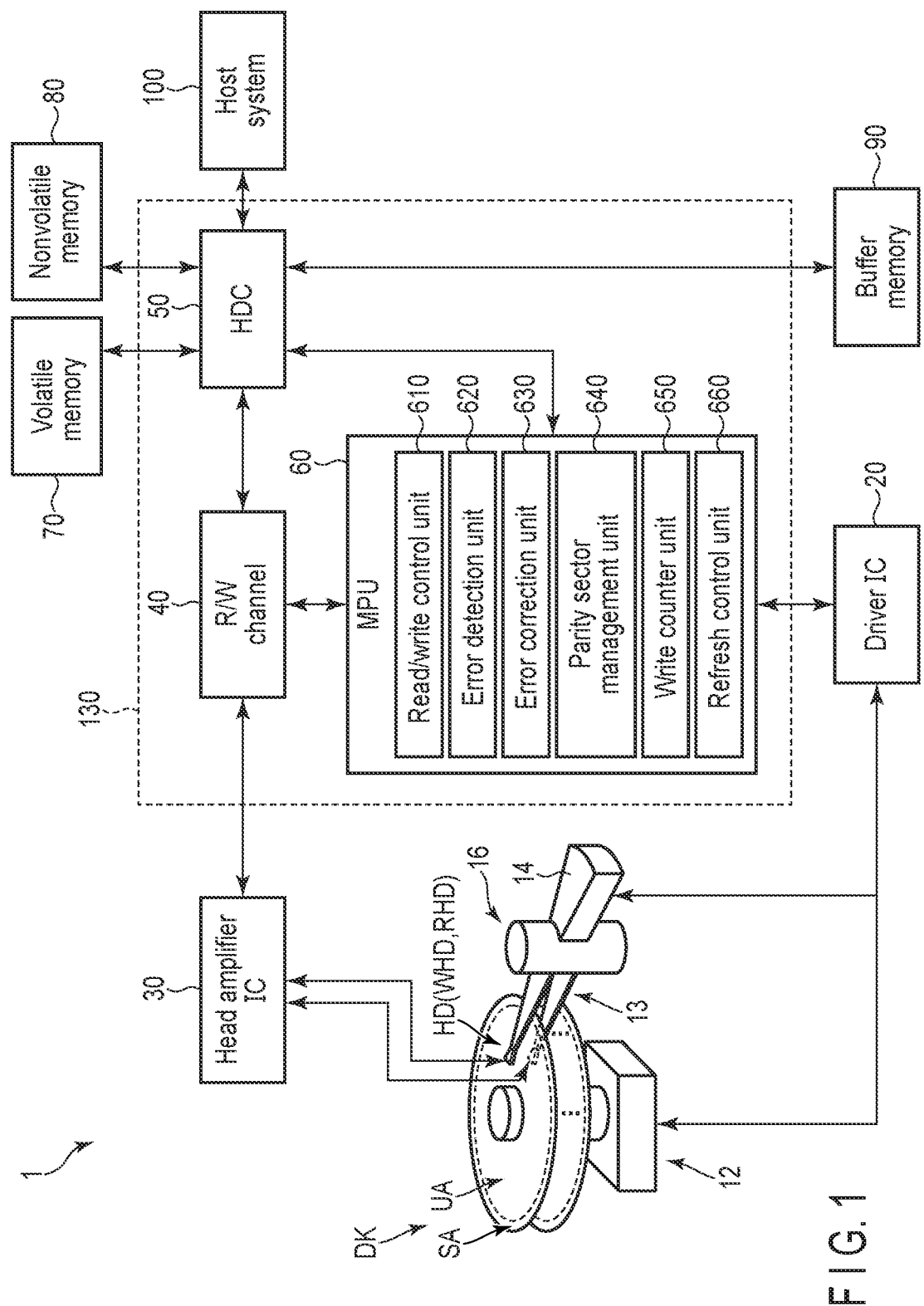
FIG. 1 is a block diagram showing a configuration of a magnetic disk device according to embodiments.

FIG. 1 is a block diagram showing a configuration of a magnetic disk device 1 according to embodiments.

The magnetic disk device 1 comprises a head disk assembly (HDA) to be described later, a driver IC 20, a head amplifier integrated circuit (hereinafter referred to as a head amplifier IC or a preamplifier) 30, a volatile memory 70, a nonvolatile memory 80, a buffer memory (buffer) 90, and a system controller 130 that is a 1-chip integrated circuit. In addition, the magnetic disk device 1 is connected to a host system (hereinafter simply referred to as a host) 100.

The HDA includes a magnetic disk (hereinafter referred to as a disk) DK, a spindle motor (hereinafter referred to as an SPM) 12, an arm 13 on which the head HD is mounted, and a voice coil motor (hereinafter referred to as a VCM) 14. The disk DK is attached to the SPM 12 and is rotated by the drive of the SPM 12. The arms 13 and the VCM 14 constitute an actuator 16. The arms 13 include at least one arm 13. For example, the arms 13 include a plurality of arms 13. The heads HD include at least one head HD. For example, the heads HD include a plurality of heads HD. The actuator 16 controls the movement of the head HD mounted on the arm 13 to a particular position on the disk DK by driving the VCM 14. Incidentally, two or more actuators 16 may be provided.

The area of the disk DK where the data can be written is assigned a user data area UA that is available for the user, and a system area SA where information necessary for system management is written. Incidentally, the disk DK may be assigned a media cache (or often referred to as a media cache area) where the data (or commands) transferred from a host 100 or the like are temporarily stored before written to a particular area of the user data area UA, as an area different from the user data area UA and the system area SA. The direction from the inner circumference to the outer circumference of the disk DK or the direction from the outer circumference to the inner circumference of the disk DK is hereinafter referred to as a radial direction. In the radial direction, the direction from the inner circumference to the outer circumference is referred to as an outer direction (or outside), and the direction from the outer circumference to the inner circumference, i.e., the direction opposite to the outer direction, is referred to as an inner direction (or inside). The direction orthogonal to the radial direction of the disk DK is referred to as a circumferential direction. That is, the circumferential direction corresponds to the direction along the circumference of the disk DK. In addition, a particular position of the disk DK in the radial direction may be referred to as a radial position, and a particular position of the disk DK. In the circumferential direction may be referred to as a circumferential position. The radial position and the circumferential position may be collectively referred to simply as a position. Incidentally, the term "track (or cylinder)" is used to indicate one of a plurality of areas divided in the radial direction of the disk DK, a path of the head HD at a particular radial position, data extending in the circumferential direction of the disk DK, data of one circumference written to the track for cylinder) at a particular radial position, data written to a particular track (or cylinder) of the disk DK, a part of data written to a particular track (or cylinder) of the disk DK, or other various meanings. The "sector" is used to indicate one of a plurality of areas that divide a particular track (or cylinder) of the disk DK in the circumferential direction, data written to a particular circumferential position at a particular radial position of the disk DK, data written to a particular sector of a particular track (or cylinder) of the disk DK, or other various meanings. The "radial width of a track (or cylinder)" may also be referred to as "track width (or cylinder width)". The "path through the central position of the track width in a particular track (or cylinder)" is referred to as a "track center (or cylinder center)". The "track center (or cylinder center) of a particular track (or cylinder)" may be referred to simply as the "track (or cylinder)".

The head HD faces the disk DK. For example, one head HD faces one side of the disk DK. The head HID comprises a slider as a main body, and comprises a write head WHD and a read head RHD mounted on the slider. The write head WHD writes the data to the disk DK. The read head RHD reads the data written to the disk DK. Incidentally, the "write head WHD" may be referred to simply as "head HD", the "read head RHD" may be referred to simply as "head ED", and the "write head WHD and read head RHD" may be collectively referred to as the "head HD". The "central part of the head WHD" may be referred to as the "head HD", the "central part of the write head WHD" may be referred to as the "write head WHD", and the "central part of the read head RHD" may be referred to as the "read head RHD". The "central part of the light head WHD" may be referred to simply as the "head HD", and the "central part of the read head RHD" may be referred to simply as the "head HD". "Positioning the central part of the head HD to the track center (or cylinder center) of a particular track (or cylinder)" is referred to as "positioning the head HD to a particular track (or cylinder)", "arranging the head HD to a particular track (or cylinder)", "locating the head HD to a particular track (or cylinder)", or the like.

Figure 2:
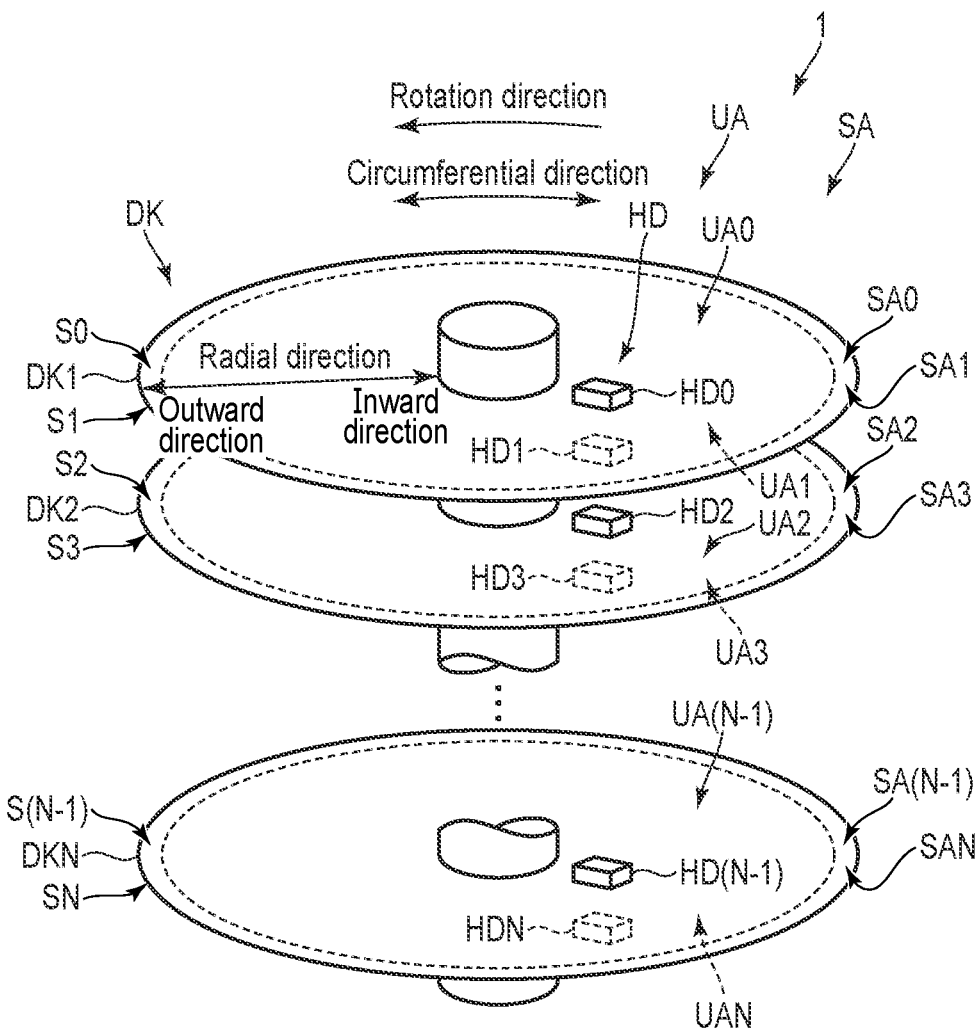
FIG. 2 is a schematic diagram showing an example of a configuration of heads to disks according to the embodiments.

FIG. 2 is a schematic diagram showing an example of the arrangement of the head DK according to the embodiments. As shown in FIG. 2, the rotation direction of the disk DK in the circumferential direction is referred to as a rotation direction. Incidentally, in the example shown in FIG. 2, the rotation direction is counterclockwise, but may be the opposite direction (clockwise).

In the example shown in FIG. 2, the disk OK includes a disk DK1, a disk DK2, . . . , and a disk DKN. The disks DK1 to DKN are stacked coaxially in one direction and spaced apart from each other. The diameters of the disks DK1 to DKN are the same as each other. The terms "same", "identical", "matching", "equivalent" and the like imply not only the meaning of being exactly the same, but also the meaning of being different to the extent that they can be regarded as substantially the same. Incidentally, the diameters of the disks DK1 to KN may be different. The disk DK1 has a surface S0 and a back surface S1 on a side opposite to the surface S0. The surface S0 includes a user data area UA0 and a system area SA0. The system area SA0 is adjacent to the user data area UA0 in the outward direction. The term "adjacent" implies not only that data, objects, areas, spaces and the like are lined up in co-tact with each other, but also that they are lined up with particular intervals. The back surface S1 includes a user data area UA1 and a system area SA1. The system area SA1 is adjacent to the user data area UA1 in the outward direction. The surface and the back surface of the disk may be hereinafter referred to as recording surfaces.

The disk DK2 has a surface S2 and a back surface S3 on a side opposite to the surface S2. The surface S2 faces the back surface S1. The surface S2 includes a user data area UA2 and a system area SA2. The system area SA2 is adjacent to the user data area UA2 in the outward direction. The back surface S3 includes a user data area UA3 and a system area SA3. The system area SA3 is adjacent to the user data area UA3 in the outward direction.

The disk DKN has a surface S(N−1) and a back surface SN on a side opposite to the surface S(N−1). The surface S(N−1) includes a user data area UA(N−3) and a system area CA(N−1). The system area SA(N−1) is adjacent to the user data area UA(N−1) in the outward direction. The back surface SN includes a user data area UAN and a system area SAN. The system area SAN is adjacent to the user data area UAN in the outward direction.

In FIG. 2, the head HD includes a head HD0, a head HD1, a head HD2, a head HD3, . . . , a head HD(N−1), and a head HDN. The head HD0 faces the surface 30. The head HD0 writes data to the surface S0 and reads data from the surface 30. The head HD1 faces the back surface S1. The head HD1 writes data to the back surface S1 and reads data from the back surface S1. The head HD2 faces the surface S2. The head HD2 writes data to the surface 32 and reads data from the surface 32. The head HD3 faces the back surface S3. The head HD3 writes data to the back surface S3 and reads data from the back surface 53. The head HD(N−1) faces the surface S(N−1). The head H(N−1) writes data to the surface S(N−1) and reads data from the surface S(N−1). The head HDN faces the back surface SN. The head HDN writes data to the back surface SN and reads data from the back surface SN.

The driver IC 20 controls the drive of the SPM 12 and the VCM 14 under control of the system controller 130 (more specifically, an MPU 60 to be described later).

The head amplifier IC (preamplifier) 30 comprises a read amplifier, a write driver, and the like. The read amplifier amplifies a read signal read from the disk DK and outputs the amplified read signal to the system controller 130 (more specifically, a read/write (R/W) channel 40 to be described later). The write driver outputs to the head HD a write current corresponding to a signal output from the R/W channel 40.

The volatile memory 70 is a semiconductor memory in which stored data is lost when power supply is cut off. The volatile memory 70 stores data and the like necessary for the processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. Incidentally, the buffer memory 90 may be configured integrally with the volatile memory 70. The buffer memory 90 is, for example, a DRAM, a static random access memory (SRAM), an SDRAM, a ferroelectric random access memory (FeRAM), a magnetoresistive random access memory (MRAM) or the like.

The system controller (controller) 130 is realized by, for example, using a large scale integrated circuit (LSI) referred to as a system-on-a-chip (SoC) in which a plurality of elements are integrated on a single chip. The system controller 130 includes a read/write (R/W) channel 40, a hard disk controller (HDC) 50, and a microprocessor or microprocessing unit (MPU) 60. The system controller 130 is electrically connected to, for example, the driver IC 20, the head amplifier IC 30, the volatile memory 70, the nonvolatile memory 80, the buffer memory 90, the host system 100, and the like.

The R/W channel 40 executes signal processing of data (hereinafter often referred to as read data) transferred from the disk DK to the host 100 and data (hereinafter often referred to as write data) transferred from the host 100, in accordance with instructions from the MPU 60 to be described later. The R/W channel 40 comprises a circuit or function of modulating the write data. The R/W channel 40 comprises a circuit or function of measuring and demodulating the signal quality of the read data. The R/W channel 40 is electrically connected to, for example, the head amplifier IC 30, the HDC 50, the MPU 60 and the like.

The HDC 50 controls the transfer of data. For example, the HDC 50 controls data transfer between the host 100 and the disk DK. In response to instructions from the MPU 60 to be described later. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 via the driver IC 20 to execute servo control for positioning the head HD. The MPU 60 controls the SPM 12 via the driver IC 20 to rotate the disk DK. The MPU 60 controls the write operation of data to the disk DK and selects a storage destination for the data transferred from the host 100, for example, the write data. In addition, the MPU 60 also controls the read operation of data from the disk DK and controls the processing of data transferred from the disk DK to the host 100, for example, read data. In addition, the MPU 60 also manages the area where data is recorded. The MPU 60 is connected to each unit of the magnetic disk device 1. The MPU 60 is electrically connected to, for example, the driver IC 20, the R/W channel 40, and the HDC 50 and the like.

The MPU 60 comprises a real/write control unit 610, an error detection unit 620, an error correction unit 630, a parity sector management unit 640, a write count unit 650, a refresh control unit 660, and the like. The MPU 60 executes the processing of each of the units, for example, the read/write control unit 610, the error detection unit 620, the error correction unit 630, the parity sector management unit 640, the write count unit 650, the refresh control unit 660, and the like, on firmware. Incidentally, the MPU 60 may comprise each of the units, or example, the read/write control unit 610, the error detection unit 620, the error correction unit 630, the parity sector management unit 640, the write count unit 650, the refresh control unit 660, and the like, as a circuit. The read/write control unit 610, the error detection unit 620, the error correction unit 630, the parity sector management unit 640, the write count unit 650, the refresh control unit 660, and the like may be incorporated in the R/W channel 40 or the HDC 50.

The read/write control unit 610 controls the read process of reading data from the disk DK and the write process of writing data to the disk DK in accordance with commands from the host 100, and the like. The read/write control unit 610 controls the VCM 14 via the driver IC 20, positions the head HD at a particular position on the disk DK, and executes the read process or the write process. The term "access" may be used to imply recording or writing data to a particular area (write process), reading data from a particular area (read process), and moving the head HD, and the like to a particular area.

For example, the read/write control unit 610 executes the write process by conventional magnetic recording (CMR) format of writing data from a particular track (or cylinder) or a particular sector to the other track (hereinafter often referred to as an adjacent track or an adjacent cylinder) or the other sector (hereinafter often referred to as an adjacent sector) that is adjacent to this track (or cylinder) or this sector in the radial direction with a particular interval (gap). The "adjacent track (or adjacent cylinder)" implies "a track (or cylinder) adjacent to the particular track (or cylinder) in the outward direction", "a track (or cylinder) adjacent to the particular track (or cylinder) in the inward direction", and "a Plurality of tracks (or a plurality of cylinders) adjacent co the particular track (or cylinder) in the outward direction and the inward direction". The "adjacent sector" implies "a sector adjacent to the particular sector in the outward direction", "a sector adjacent to the particular sector in the inward direction", and "a plurality of sectors adjacent to the particular sector in the outward direction and the inward direction". In the following descriptions, "writing data in the conventional magnetic recording" may be referred to as "executing the conventional magnetic recording", "executing the conventional magnetic recording", or simply "writing". The read/write control unit executes random write of writing data at random and executes sequential write of writing data.

Incidentally, when sequentially writing a plurality of tracks (or a plurality of cylinders), the read/write control unit 610 may execute the write process by shingled write magnetic recording (SMR) or shingled write recording (SWR) format of overwriting a track (or cylinder) to be next written, to a part of the previously written track (or cylinder) in the radial direction. In the following descriptions, "writing data in the shingled write recording" may be referred to as "shingled write recording", "executing the shingled write recording", or simply "writing".

For example, the read/write control unit 610 can write data or tracks (or cylinders) such that the track per inch (TPI) of a particular area becomes a TPI higher than the currently set TPI or can write data or tracks (or cylinders) such that the track per inch (TPI) of a particular area becomes a TPI lower than the currently set TPI.

The error detection unit 620 detects data, sectors, areas, and the like in which errors have occurred. For example, the error detection unit 620 detects data that cannot be read (hereinafter often referred to as read error data or error data) or sectors that cannot be read (hereinafter often referred to as read error sectors or error sectors). Error data and error sectors can be caused by, for example, defects, misalignment of the head ID, misalignment of adjacent tracks for adjacent cylinders) and the like.

The error correction unit 630 recovers (corrects, rescues, or error-corrects) the error data or error sectors. The error correction unit 630 executes rear retry of reading the error data or error sectors at a plurality of times. In addition, the error correction unit 630 executes processing (hereinafter often referred to as ECC processing or error correction processing) of correcting errors (mistakes) in error data or error sectors, based on an error correction code. The error correction unit 630 executes ECC processing (hereinafter often referred to as sector ECC processing) on this error data or this error sector, based on the ECC (hereinafter often referred to as sector ECC) corresponding to the error data or error sector of a particular track (or a particular cylinder). The sector ECC processing corresponds to the error correction or error correction processing in units of sectors.

Based on ECC (hereinafter often referred to as track ECC) corresponding to a particular track (or a particular cylinder) or a part of the particular track (or the particular cylinder), for example, a plurality of data or a plurality of sectors continuously arranged in a circumferential direction in the particular track (or the particular cylinder), the error correction unit 630 executes ECC processing (hereinafter often referred to as track ECC processing) on this track (or the particular cylinder) or a part of this track (or the particular cylinder), for example, a plurality of data or a plurality of sectors arranged continuously in a circumferential direction in this track. The track ECC processing corresponds zo the error correction processing in units of tracks or the error correction processing. The unit of track may imply not only a physical unit of track, but also a regional unit composed of less than a physical track. For example, based on the parity data or parity sectors corresponding to a particular track (or a particular cylinder) or a part of a particular track (or a particular cylinder), the error correction unit 630 executes the track ECC processing on the error sectors of this track (or the particular cylinder) or a part of this track (or the particular cylinder). For example, the error correction unit 630 records information related to the error data or error sectors (hereinafter often referred to as error data information or error sector information) in a particular recording area, for example, the disk DK, the volatile memory 70, or the nonvolatile memory 80.

The parity sector management unit 640 calculates the parity sector (or parity data) by executing an exclusive CR (XOR) operation, writes the parity sector (or parity data), and manages this parity sector (or parity data).

When writing a particular track (or a particular cylinder), the parity sector management unit 640 calculates the parity sector (or parity data) by executing an XOR operation on all sectors (or data) other than the parity sector of this track (or this cylinder), writes (or changes) the calculated parity sector (or parity data), and manages this parity sector (or parity data). In addition, when writing several sectors (or data) of a particular track (or particular cylinder), the parity sector management unit 640 reads the track (or particular cylinder) to which several sectors are to be written, calculates the parity sector by executing the XOR operation on all sectors (or data) other than the parity sector of the track (or cylinder) in which sectors (or data) corresponding to several sectors (or data) are replaced with several sectors (or data) in a particular recording area, for example, the volatile memory 70 or the like, writes (or changes) all sectors other than the parity sectors of the track (or cylinder) replaced with several sectors (or data) and the calculated parity sector (or parity data) to the same tracks (or cylinders), and manages this parity sector (or parity data). In the following descriptions, "when writing particular data (hereinafter often referred to as update data) or a particular sector (hereinafter often referred to as an update sector), reading the track or cylinder to which the update data or the update sector is to be written, calculating the parity sector (hereinafter often referred to as an update parity sector) by executing the XOR operation on all sectors (hereinafter often referred to as ark update sector group; other than the parity sector of the track or cylinder (hereinafter often referred to as an update track or update cylinder) in which the data or the sector corresponding to the update data or the update sector is replaced with the update data or the update sector, and writing the update sector group and the update parity sector to the same track or the same cylinder" is often referred to as "read modify write". For convenience of description, "executing the XOR operation on sectors other than the parity sector" may be hereinafter referred to as "executing the XOR operation on the sectors".

The parity sector management unit 640 calculates the parity sectors by executing the XOR operation on the data in a particular area, and writes the calculated parity sectors to a particular area of the disk DK. The parity sector management unit 640 calculates the parity sectors by executing the XOR operation on all sectors of a particular track (or a particular cylinder), and writes the calculated parity sectors to this track (or this cylinder). Incidentally, the parity sector management unit 640 may calculate the parity sectors by executing the XOR operation on several sectors of a particular track (or a particular cylinder) and write the calculated parity sectors to this track (or this cylinder). For example, the parity sector management unit 640 may calculate the parity sectors by executing the XOR operation on all sectors (hereinafter often referred to as valid sectors) other than an invalid sector (hereinafter often referred to as an invalid sector) in a particular track (or a particular cylinder) and write the calculated parity sectors to this track (or this cylinder). The invalid sector corresponds to a sector that is not used for data recording, for example, an error sector. The valid sector corresponds to a sector that is used for data recording, and the like. For convenience of description, "executing the XOR operation on the valid sectors other than the invalid sector" may be hereinafter referred to as "executing the XOR operation on the sectors".

The parity sector management unit 640 manages whether each parity sector corresponding to each track or a part of the track is a valid parity sector (hereinafter often referred to as a valid parity sector) that can be used for error correction, for example, the track ECC processing or an invalid parity sector (hereinafter often referred to as a valid parity sector) that cannot be used for error correction, for example, the track ECC processing.

The parity sector management unit 640 manages the parity sectors subjected to the XOR operation on all sectors of a particular track as valid parity sectors.

The parity sector management unit 640 records the parity sectors of this track as the valid parity sectors in a particular recording area, for example, the disk DK, the volatile memory 70, or the nonvolatile memory 80. The parity sector management unit 640 records the track or cylinder (hereinafter often referred to as a correctable track or a correctable cylinder) on which the track ECC processing can be executed (or corrected) based on the valid parity sector, in a particular recording area, for example, the disk DK, the volatile memory 70, or the nonvolatile memory 80.

The parity sector management unit 640 writes (or overwrites) at least one sector, for example, a valid sector (hereinafter often referred to as a rear sector), which is continuously arranged in the circumferential direction from the parity sectors in the particular track, and manages the parity sectors obtained by executing the XOR operation on all rear sectors, for example, the valid sector as the valid parity sectors. The parity sector management unit 640 records the parity sectors of this track as the valid parity sectors in a particular recording area, for example, the disk DK, the volatile memory 70, or the nonvolatile memory 80. The parity sector management unit 640 records the rear sectors on which the track ECC processing can be executed (or corrected) based on the valid parity sectors in a particular track, in a particular recording area, for example, the disk DK, the volatile memory 70, or the nonvolatile memory 80. In addition, when a particular track includes a rear sector on which the track ECC processing can be executed (or corrected) based on the valid parity sectors, the parity sector management unit 640 records a sector (for example, a front sector; other than the rear sector on which the track ECC processing cannot be executed (or cannot be corrected) to a particular recording area, for example, the disk DK, the volatile memory 70, or the nonvolatile memory 80.

When the parity sector of the track on which the front sector, for example, the valid sector (hereinafter often referred to as the front sector) is written (overwritten) is the parity sector (hereinafter often referred to as a front parity sector) corresponding to the results of the XOR operations on all sectors of the track before writing the front sector, the parity sector management unit 640 manages this parity sector as an invalid parity sector. The parity sector management unit 640 records the parity sector of this track as an invalid parity sector in a particular recording area, such as the disk DK, the volatile memory 70, or the nonvolatile memory 80. The parity sector management unit 640 records tracks or cylinders on which the track ECC processing cannot be executed (or cannot be corrected) (hereinafter often referred to as uncorrectable tracks or uncorrectable cylinders), in a particular recording area, for example, the disk DK, the volatile memory 70, or the nonvolatile memory 80.

In the following descriptions, "at least one sector on which the track ECC processing can be executed" may be referred to as a "correctable sector" or a "logical track". In addition, "at least one sector on which the track ECC cannot be executed (or cannot be corrected)" may be referred to as an "uncorrectable sector". The "areas where the track ECC can be executed (or corrected), such as correctable tracks, correctable cylinders, correctable sectors and the like" way be collectively referred to as "correctable areas", and the "areas where the track ECC cannot be executed (or corrected), such as uncorrectable tracks, uncorrectable cylinders, uncorrectable sectors and the like" may be collectively referred to as "uncorrectable areas".

Every time the parity sector management unit 640 receives, for example, a command to execute random write from the host 100, the parity sector management unit 640 manages the correctable area and the uncorrectable area in the same user zone. The user zone is an area in which the user data area 10 UA is divided in each particular range in the radial direction, and corresponds to, for example, Iwo adjacent tracks, one track, one of 40 areas obtained by dividing the user data area 10 UA in the radial direction, or the like. For example, every time the parity sector management unit 640 executes the random write, the parity sector management unit 640 updates or changes the correctable area and the uncorrectable area in the same user zone.

The write count unit 650 counts the number of times of writing the data (hereinafter often referred to as the number of writes or write count). The number of writes (or write count) corresponds to, for example, the number of times of being affected by the influence of the magnetic flux leakage from the head HD (adjacent track interference: ATI) or the like due to writing the data. The write count unit 650 may store the number of writes as a table, in a particular recording area, for example, the disk DK, the volatile memory 70, the nonvolatile memory 80, the buffer memory 90 or the like.

The write count unit 650 counts the number of writes of writing the data from an area of target (hereinafter often referred to as a target area) to an area (hereinafter often referred to as a proximity area) arranged in a particular range in a radial direction. For example, the write count unit 650 counts the number of writes of writing the data to the proximity area arranged in a range that receives ATI from the target area.

When writing the data to the proximity area of the target area, the write count unit 650 increases (increments) the number of writes corresponding to this target area by a particular value. For example, when writing the data to the proximity area in the outward and inward directions of the target area, the write count unit 650 increases (increments) the number of writes corresponding to this target area by a particular value. For example, when writing the data to the proximity area in the outward and inward directions of the target area, the write count unit 650 increases (increments) the write count corresponding to this target area by 1.

The write count unit 650 counts the number of writes of writing the data to an area adjacent to the target area in the radial direction (hereinafter often referred to as an adjacent area). For example, the write count unit 650 counts the number of writes of writing the data to the adjacent area arranged in the range of receiving ATI from the target area.

When writing the data to the adjacent area of the target area, the write count unit 650 increases (increments) the number of writes corresponding to the target area by a particular value. For example, when writing the data to the adjacent area in the outward and inward directions of the target area, the write count unit 650 increases (increments) the number of writes corresponding to the target area by a particular value. For example, when writing the data to the adjacent area in the outward and inward directions of the target area, the write count unit 650 increments the number of writes corresponding to the target area by 1.

The write count unit 650 counts the number of writes of writing the data to a track (hereinafter often referred to as an adjacent track) or a sector (hereinafter referred to as an adjacent track) adjacent to a track of target (hereinafter often referred to as a target track) or a sector of target (hereinafter referred to as a target sector) in the radial direction.

When writing the data to the adjacent track or the adjacent sector of the target track or the target sector, the write counting unit 650 increases (increments) the number of writes corresponding to the target track or the target sector by a particular value. For example, when writing the data to the adjacent track in the outward and inward directions of the target track or the target sector, the write count unit 650 increases (increments) the number of writes corresponding to the target track or the target sector by a particular value. For example, when writing the data to the adjacent track or the adjacent sector in the outward and inward directions of the target track or the target section, the write count unit 650 increases (increments) the number of writes corresponding to the target track or the target sector by 1.

The refresh control unit 660 executes a process (hereinafter often referred to as a refresh process) of rewriting the same data as data written to a particular area, for example, a particular track, in this area, for example, the particular track. When determining that the number of writes corresponding to the particular area exceeds a threshold value (hereinafter often referred to as a refresh threshold value) corresponding to the number of writes of executing the refresh process, the refresh control unit 660 executes the refresh process in this area. When determining that the number of writes corresponding to the particular area exceeds the refresh threshold value, the refresh control unit 660 executes the refresh process in a part of this area. In other words, when determining that the number of writes corresponding to the particular area exceeds the refresh threshold value, the refresh control unit 660 executes the refresh process on the data less than or equal to the capacity set as the format in advance in this area. When executing the refresh process in the particular area, the refresh control unit 660 resets the number of writes corresponding to this area, for example, sets the number of writes to 0.

When determining that the number of writes corresponding to the target track or the target sector exceeds the refresh threshold value corresponding to this target track or this target sector, the refresh control unit 660 executes the refresh process to this target track or this target sector. When determining that the number of writes corresponding to the target track or the target sector exceeds the refresh threshold value corresponding to this target track or this target sector, the refresh control unit 660 executes the refresh process in a part of this target track or a part of this target sector. In other words, when determining that the number of writes corresponding to the target track or the target sector exceeds the threshold value corresponding to this target track or this target sector, the refresh control unit 660 executes the refresh process on the data less than the capacity set as the format in advance for this target track or this target sector.

The refresh control unit 660 changes (or sets) the refresh threshold value. The refresh control unit 660 has a plurality of refresh threshold values.

The refresh control unit 660 changes (or sets) the refresh threshold value of the correctable area to a refresh threshold value that is higher than a currently set refresh threshold value (hereinafter often referred to as a current refresh threshold value) in a plurality of refresh threshold values. The refresh control unit 660 changes (or sets) the refresh threshold value of the uncorrectable area to a refresh threshold value that is lower than the current refresh threshold value in the plurality of refresh threshold values.

In addition, the refresh control unit 660 sets the refresh threshold value of the correctable area to a refresh threshold value that is higher than the refresh threshold value of the uncorrectable area in the plurality of refresh threshold values, and sets the refresh threshold value of the uncorrectable area to a refresh threshold value that is lower than the refresh threshold value of the correctable area in the plurality of refresh threshold values.

The refresh control unit 660 has two refresh threshold values, for example, a high refresh threshold value and a low refresh threshold value. Incidentally, the refresh control unit 660 may have three or more refresh threshold values. The high refresh threshold value is larger than the low refresh threshold value, and the low refresh threshold value is smaller than the high refresh threshold value. The refresh control unit 660 sets the refresh threshold value of the correctable area to the high refresh threshold value and sets the refresh threshold value of the uncorrectable area to the low refresh threshold value. The refresh control unit 660 executes the refresh processing in the uncorrectable area where the low refresh threshold value is set with a frequency smaller than a frequency of the refresh processing in the correctable area where the high refresh threshold is set. In other words, the refresh control unit 660 executes the refresh processing in the correctable area where the high refresh threshold value is set with a frequency larger than the frequency of the refresh processing in the uncorrectable area where the low refresh threshold is set. The frequency corresponds to, for example, the number of times of executing the processing at a specific time.

For example, the refresh control unit 660 sets the refresh threshold value of the correctable track or correctable cylinder to a high refresh threshold value, and sets the refresh threshold value of the uncorrectable track or correctable cylinder to a low refresh threshold value.

For example, the refresh control unit 660 sets the refresh threshold value of the correctable sector (or logical track) to a high refresh threshold value and sets the refresh threshold value of the uncorrectable sector (or logical track) to a low refresh threshold value.

In a plurality of heads HD corresponding to a particular cylinder (track), the refresh control unit 660 may set the refresh threshold value of the track corresponding to each head HD to a different refresh threshold value. Incidentally, in the plurality of heads HD corresponding to a particular cylinder (track), the refresh control unit 660 may set the refresh threshold value of the track corresponding to each head HD to the same refresh threshold value.

For example, when maintaining a constant performance by the plurality of heads HD for a particular cylinder (track), the refresh control unit 660 sets the refresh threshold value of the cylinder (track) corresponding to at least one head HD in these plurality of heads HD to a high refresh threshold value, and sets the refresh threshold value of the cylinders (tracks) corresponding to the other heads HD other than the at least one head HD set to the high refresh threshold value in the plurality of heads HD to a low refresh threshold value.

For example, the refresh control unit 660 maintains a constant performance by four heads HD for a particular cylinder (track) and, in a case where the refresh threshold values of the four cylinders (tracks) corresponding to the four heads HD are 300 times, 300 times, 300 times, and 300 times, respectively, increases the two refresh threshold values corresponding to the two correctable cylinders (correctable tracks) corresponding to each of the two head HDs in the four heads HD by 0.0 times respectively. In this case, the refresh control unit 660 reduces the two refresh threshold values corresponding to the two cylinders (tracks) to which the remaining two heads HD other than the two heads HD corresponding to the correctable cylinders (correctable tracks) of the four heads H) correspond, respectively, by 100 times each. In this case, the refresh control unit 660 can improve the TPI of the two heads HD that do not correspond to the correctable cylinders (correctable tracks) while maintaining the performance of the four heads HD. Incidentally, if the remaining two heads HD other than the two heads HD corresponding to the correctable cylinders (correctable tracks) of the four heads HD correspond to the two uncorrectable cylinders (uncorrectable tracks) that are subjected to random write, respectively, the refresh control unit 660 improves the two refresh threshold values corresponding to the two cylinders (tracks) to which these two heads HDs correspond, respectively, at 330 times and 300 times, respectively. In this case, "executing random write to a particular track, for example, a correctable track (correctable cylinder)" corresponds to "writing error correction in units of tracks, in units less than or equal to those of execution". For this reason, by executing random write to a specified track, for example, a correctable track (correctable cylinder), error correct on in units of tracks becomes unable to be executed in this track. If the number of writes to the correctable cylinder (correctable track) is larger than the refresh threshold value of the uncorrectable cylinder (uncorrectable track), the correctable cylinder (correctable track) becomes an uncorrectable track when executing random write to the correctable cylinder (correctable track), and the refresh control unit 660 therefore does not permit random write to the correctable cylinder (correctable track) but executes the read modify write to the correctable cylinder (correctable track) and maintains the correctable track.

Figure 3:
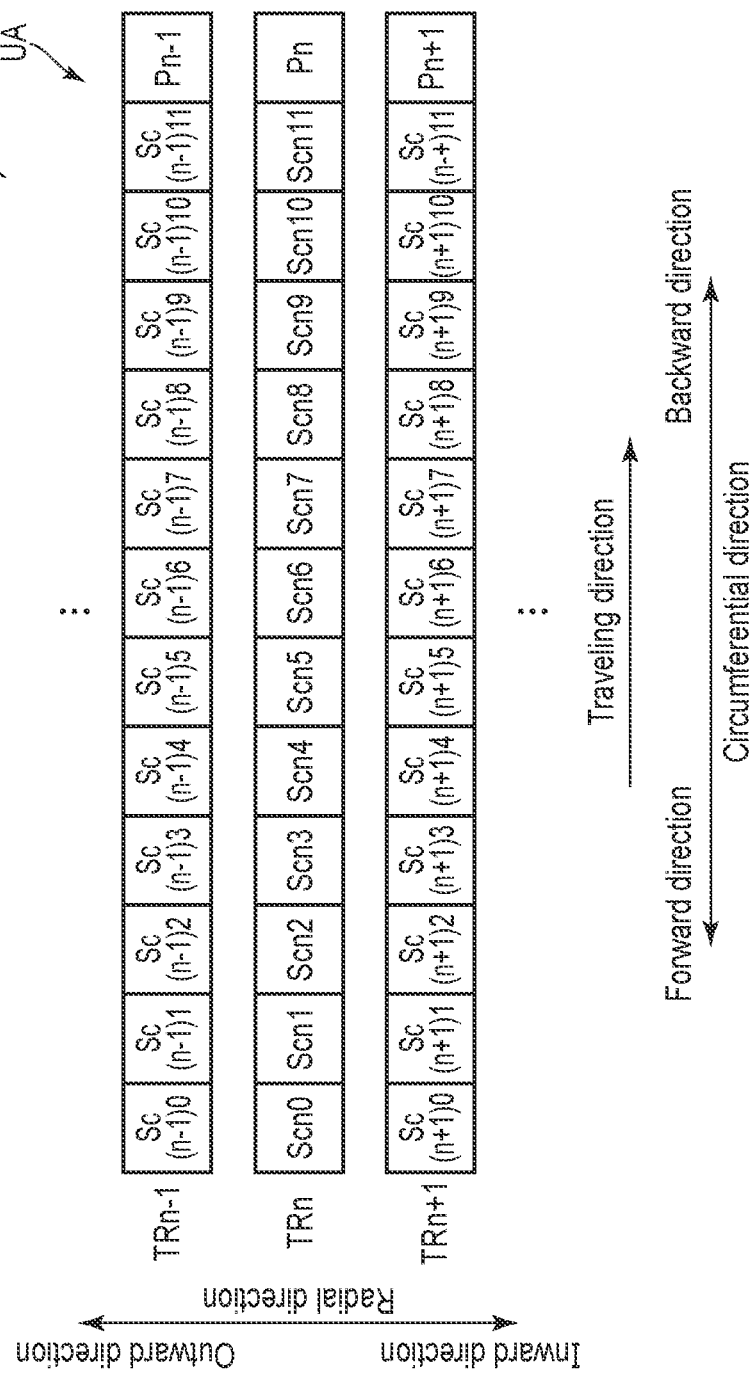
FIG. 3 is a schematic diagram showing an example of track ECC processing.

FIG. 3 is a schematic diagram showing an example of track ECC processing. FIG. 3 shows the direction in which the head HD travels to the disk DK in the circumferential direction, that is, the direction of read/write (hereinafter often referred to as the traveling direction). In FIG. 3, the traveling direction is a backward direction (or simply referred to as backward). Incidentally, the traveling direction may be a forward correction (or simply referred to as forward). FIG. 3 shows a track TRn−1, a track TPn, and a track TRn+1. In FIG. 3, the tracks TRn−1 to TRn−1 are arranged in the order described from the outward direction to the inward direction. The track TRn is adjacent to the track TRn−1 in the outward direction, and the track TRn+1 is adjacent to the track TRn in the outward direction. The track TPn−1 includes sectors Sc(n−1)0, Sc(n−1)1, Sc(n−1)2, Sc(n−1)3, Sc(n−1)4 Sc(n−1)4, Sc(n−1)5, Sc(n−1)6, Sc(n−1)7, Sc(n−1)8, Sc(n−1)9, Sc(n−1)10, and Sc(n−1)11, and a parity sector Pn−1. The sectors Sc(n−1)0, Sc(n−1)1, Sc(n−1)2, Sc(n−1)3, Sc(n−1)4, Sc(n−1)5, Sc(n−1)6, Sc(n−1)7, Sc(n−1)8, Sc(n−1)9, Sc(n−1)10, and Sc(n−1)11, and the parity sector Pn−1 are written successively in the order listed in the traveling direction. The parity sector Pn−1 corresponds to the result of the XOR operation on the sectors Sc(n−1)0 to Sc(n−1)11. In other words, the parity sector Pn+1 is a valid parity sector. The track TRn−1 corresponds to the correctable track. The track TRn includes the sectors Scn0, Scn1, Scn2, Scn3, Scn4, SCn5, Scn6, Scn7, Scn8, SCn9, Scn10, and SCn11, and the parity sector Pn. The sectors Scn0, Scn1, Scn2, Scn3, Scn4, Scn5, Scn6, Scn7, SCn8, Scn9, Scn10, and Scn11, and the parity sector Pn are written successively in the order listed in the traveling direction. The parity sector Pn corresponds to the result of the XOR operation on the sectors Scn0 to Scn11. In other words, the parity sector Pn is a valid parity sector. The track TRn corresponds to the correctable track. The track TRn+1 includes the sectors Sc(n+1)0, Sc(n+1)1), Sc(n+1)2, Sc(n+1)3, Sc(n+1)4, Sc(n+1)5, Sc(n+1)6, Sc(n+1)7, Sc(n+1)8, Sc(n+1)9, Sc(n+1)10, and Sc(n+1)11, and the parity sector Pn+1. The sectors Sc(n+1)0, Sc(n+1)1, Sc(n+1)2, Sc(n+1)3, Sc(n+1)4, Sc(n+1)5, Sc(n+1)6, Sc(n+1)7, Sc(n+1)8, Sc(n+1)9, Sc(n+1)10, Sc(n+1)11, and the parity sector Pn+1 are Sc(n+1)8, Sc(n+1)9, Sc(n+1)10, and Sc(n+1)11, and the parity sector Pn+1 are written successively in the order listed in the traveling direction. The parity sector Pn+1 corresponds to the result of the XOR operation on the sectors Sc(n+1)0 to Sc(n+1)11. In other words, the parity sector Pn+1 is a valid parity sector. The track TRn+1 corresponds to the correctable track. For example, the track TRn is set to a high refresh threshold value.

In the example shown in FIG. 3, in a case of detecting an error sector in sectors Scn0 to Scn11 of track TRn, when the MPU 60 cannot correct this error sector by read retry and sector ECC processing, the MPU 60 executes the track ECC processing based on the parity sector Pn to this error sector to correct this error sector. When writing each sector of the track TPn−1 and TRn+1, the MPU 60 increments the number of writes corresponding to the track TRn. When determining that the number of writes corresponding to the track TRn exceeds the high refresh threshold value, the MPU 60 executes the refresh processing for the track TRn.

Figure 4:
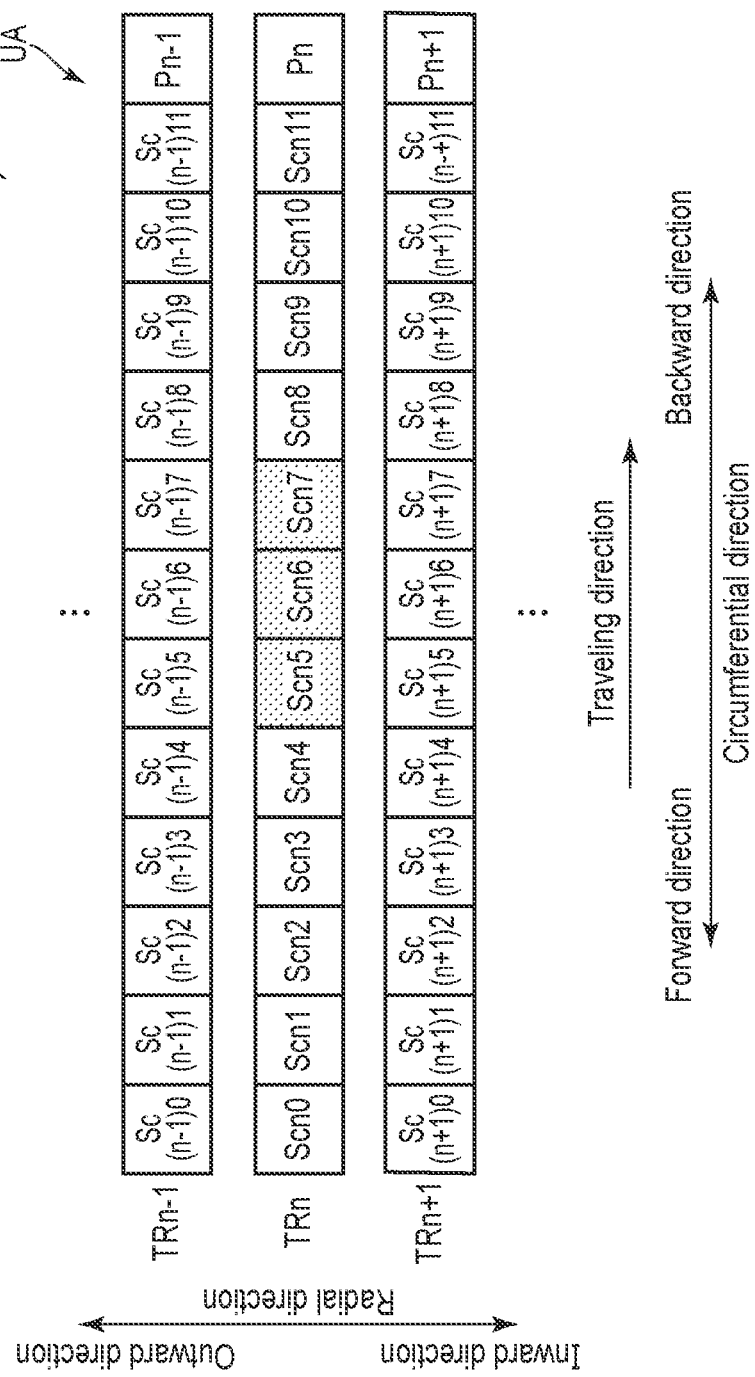
FIG. 4 is a schematic diagram showing an example of the track ECC processing.

FIG. 4 is a schematic diagram showing an example of the track ECC processing. FIG. 4 corresponds to FIG. 3.

In the example shown in FIG. 4, the MPU 60 randomly overwrites sectors Scn5, Scn6, and Scn7 of the track TRn. The MPU 60 records the track TRn as an uncorrectable track in a particular recording area, for example, the volatile memory 70, the nonvolatile memory 80, or the buffer memory 90. For example, the MPU 60 sets the refresh threshold value of the track TRn to a low refresh threshold value. In a case of detecting an error sector in the sectors Scn0 to Scn11 of the track TRn, when the MPU 60 cannot correct this error sector by the read retry and the sector ECC processing, the MPU 60 cannot execute the track ECC processing on the error sector of the track TRn. When writing each sector of the track TRn−1 and TRn−1, the MPU 60 increments the number of writes corresponding to the track TRn. When determining that the number of writes corresponding to the track TRn exceeds the low refresh threshold value, the MPU 60 executes the refresh processing on the track TRn.

Figure 5:
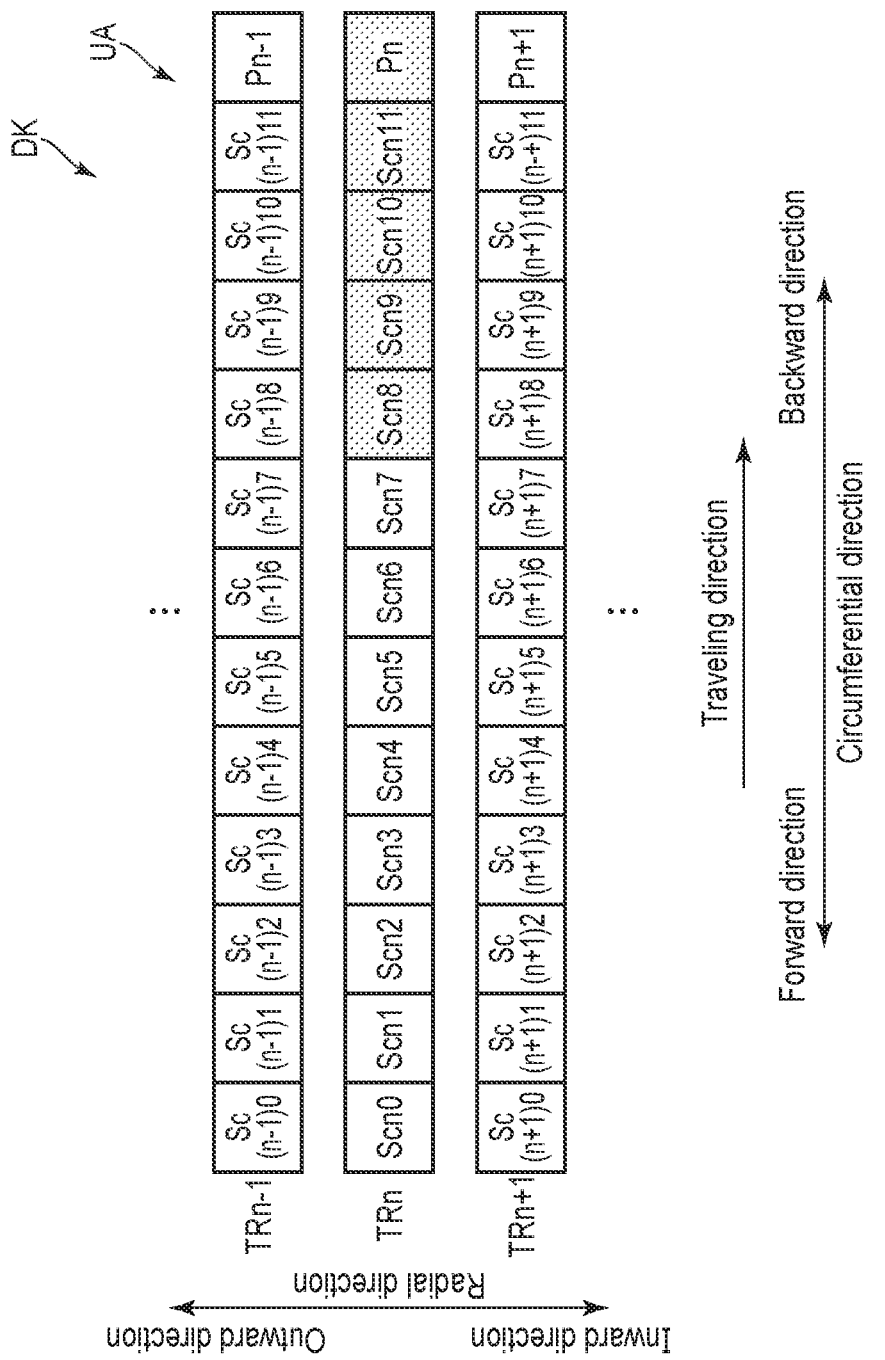
FIG. 5 is a schematic diagram showing an example of the track ECC processing.

FIG. 5 is a schematic diagram showing an example of the track ECC processing. FIG. 5 corresponds to FIG. 3.

In the example shown in FIG. 5, the MPU 60 overwrites the rear sectors Scn8, Scn9, Scn10, and S-nil of the track TRn. The MPU 60 overwrites the parity sectors Pn by executing the XOR operation on the rear sectors Scn8 to Scn11. The MPU 60 records the rear sectors Scn8 to Scn11 as correctable sectors in a particular storage area, for example, the volatile memory 70, nonvolatile memory 80, or the buffer memory 93. The MPU 60 records the front sectors Scn0 to Scn7 as uncorrectable sectors in a particular storage area, for example, the volatile memory 70, the nonvolatile memory 80, or the buffer memory 90. The MPU 60 sets the refresh threshold values of the rear sectors Scn8 to Scn11 to high refresh threshold values and sets the refresh threshold values of the front sectors Scn0 to Scn7 to low refresh threshold values. In a case of detecting an error sector in the rear sector Scn8 to Scn1 of the track TRn, when the MPU 60 cannot correct the error sector by the read retry and the sector ECC processing, the MPU 60 executes the track ECC processing based on the parity sector Pn to correct the error sector. In a case of detecting an error sector in the front sectors Scn0 to Scn7 of the track TRn, when the MPU 60 cannot correct this error sector by the read retry and the sector ECC processing, the MPU 60 cannot execute the track ECC processing on the error sector of this track TRn. When writing the sectors Sc(n−1)8 to Sc(n−1)11 of the track TRn−1 and the sectors Sc(n+1)8 to Sc(n+1)11 of the track TRn+1, the MPU 60 increments the number of writes corresponding to the rear sectors Scn8 to Scn11 of the track TRn. When determining that the number of writes corresponding to the rear sectors Scn8 to Scn11 of the track TRn exceeds the high refresh threshold value, the MPU 60 executes the refresh processing on the rear sectors Scn8 to Scn11. When writing the sectors Sc(n−1)0 to Sc(n−1)7 of the track TRn−1 and the sectors Sc(n+1)0 to Sc(n+1)7 of the track TRn+1, the MPU 60 increments the number of writes corresponding to the front sectors Scn0 to Scn7 of the track TRn. When determining that the number of writes corresponding to the front sectors Scn0 to Scn7 of the track TRn exceeds the low refresh threshold value, the MPU 60 executes the refresh processing on the front sectors Scn0 to Scn7. The MPU 60 executes the refresh processing to the rear sectors Scn8 to Scn11 with a frequently larger than the frequency of executing the refresh processing to the front sectors Scn0 to Scn7.

Figure 6:
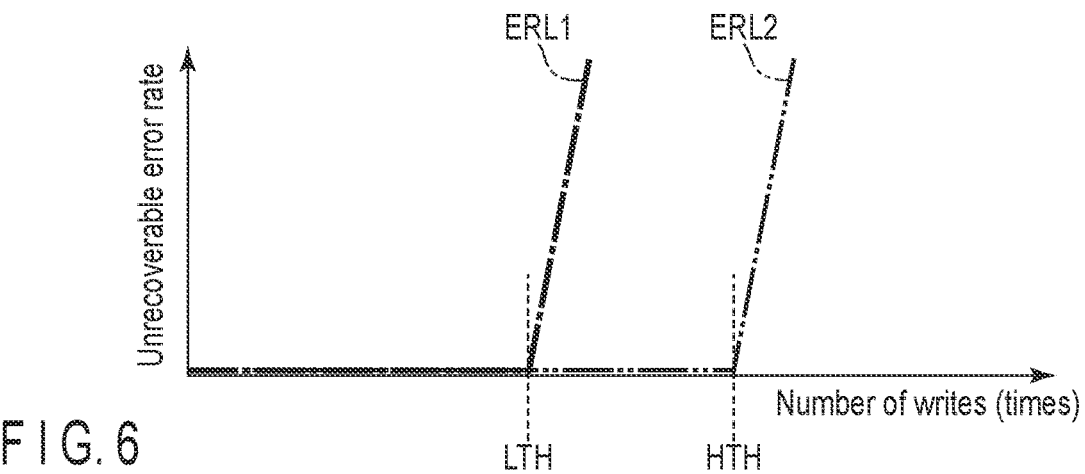
FIG. 6 is a schematic graph showing an example of a refresh threshold value according to the embodiments.

FIG. 6 is a schematic diagram showing an example of refresh threshold values LTH and HTH according to the embodiments. In FIG. 6, the horizontal axis indicates the number of writes (times), and the vertical axis indicates an unrecoverable error rate. On the vertical axis of FIG. 6, the unrecoverable error rate increases toward the direction of the tip of the arrow and decreases toward a side opposite to the tip of the arrow. On the horizontal axis of FIG. 6, the number of writes increases toward the direction of the tip of the arrow and decreases toward a side opposite to the tip of the arrow. The horizontal axis in FIG. 6 indicates the low refresh threshold value LTH and the high refresh threshold value HTH. FIG. 6 shows a change in the unrecoverable error rate corresponding to the uncorrectable area (hereinafter referred to as change in the unrecoverable error rate) ERL1, and a change in the unrecoverable error rate corresponding to the correctable area (hereinafter referred to as the change in the unrecoverable error rate) ERL2. As represented in the change in the unrecoverable error rate ERL1 and the change in the unrecoverable error rate ERL2 in FIG. 6, the unrecoverable error rate for the number of writes is lower in the correctable area than that in the uncorrectable area.

In the example shown in FIG. 6, the MPU 60 sets the refresh threshold value of the correctable area to a high refresh threshold value and sets the refresh threshold value of the uncorrectable area to a low refresh threshold value. The MPU 6 sets the TPI of the head HD corresponding to the uncorrectable area to a high TPI. When determining that the number of writes corresponding to the correctable area exceeds the high refresh threshold value, the MPU 60 executes the refresh processing to the correctable area. When determining that the number of writes corresponding to the uncorrectable area exceeds the low refresh threshold value, the MPU 60 executes the refresh processing to the uncorrectable area. The MPU 60 executes the refresh processing to the uncorrectable area with a frequency larger than the frequency of executing the refresh processing to the correctable area.

Figure 7:
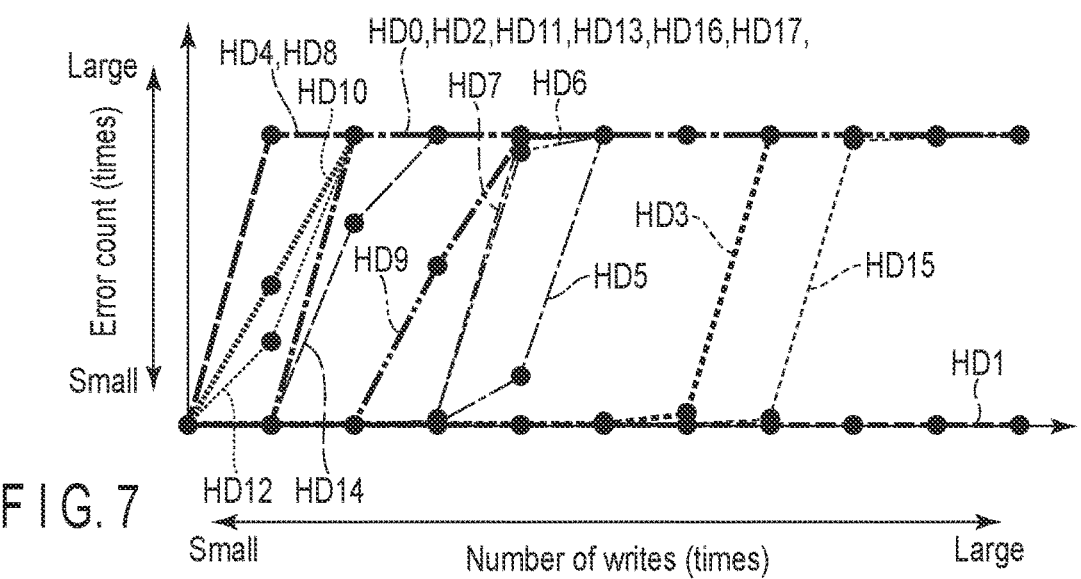
FIG. 7 is a schematic graph showing an example of measured values of the change in the error count to the number of writes by a read process that does not execute the track ECC processing.

FIG. 7 is a schematic diagram showing an example of a measured value of the change in error count against the number of writes by a read process that does not execute the track ECC processing. In FIG. 7, the horizontal axis indicates the number of writes (times), and the vertical axis indicates the error count (times), which corresponds to the number of times of occurrence of errors at the read time. On the horizontal axis of FIG. 7, The number of writes increases toward a tip of a large arrow, and decreases toward a tip of a small arrow. On the vertical axis of FIG. 7, the error count increases toward a tip of a large arrow and decreases toward a tip of a small arrow. FIG. 7 shows the change in error count for the number of writes by normal read processing that does not execute the track ECC processing corresponding to the plurality of heads HD (HD0, HD1, HD2, HD3, HD4, HD5, HD6, HD7, HD8, HD9, HD10, HD11, HD12, HD13, HD14, HD15, HD16, and HD17) (hereinafter simply referred to as a change in error count).

In the example shown in FIG. 7, when detecting an error sector in a cylinder of surfaces of a plurality of disks DK corresponding to the plurality of heads D respectively, the MPU 60 reads this cylinder with these heads HD without executing the track ECC processing on the error sector.

Figure 8:
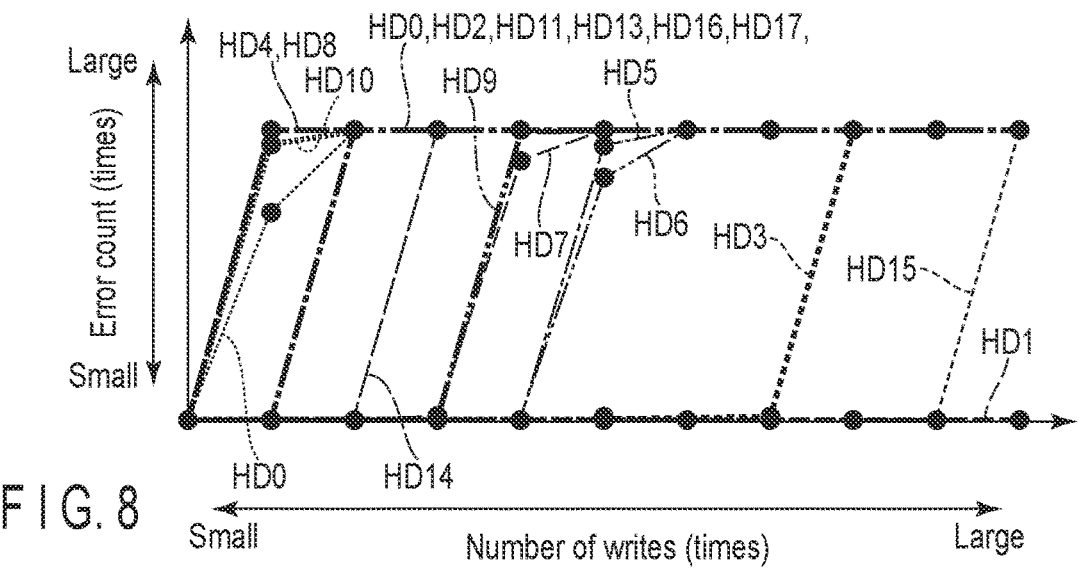
FIG. 8 is a schematic graph showing an example of measured values of the change in the error count to the number of writes by the read process that executes the track ECC processing.

FIG. 8 is a schematic diagram showing an example of the measured values of the change in error count to the number of writes by the read process that executes the track ECC processing. FIG. 8 corresponds to FIG. 7.

In the example shown in FIG. 3, where detecting an error sector in a cylinder of the surfaces of the plurality of disks DK corresponding to the plurality of heads HD, respectively, the MPU 60 executes the track ECC processing on the error sector and reads this cylinder with these heads HD.

The plurality of error rates corresponding to the plurality of heads HD in a case of executing the read process of executing the track ECC processing on a particular cylinder of the surfaces of the plurality of disks DK with the plurality of heads HD, is substantially more desirable than the plurality of error rates corresponding to the plurality of heads HD in a case of executing the read process of not executing the track ECC processing on a particular cylinder of the surfaces of the plurality of disks DK with the plurality of heads HD. For this reason, the refresh threshold value corresponding to the correctable area can be made larger than the current refresh threshold value. When the refresh threshold value corresponding to the correctable area is increased, the TPI is increased by decreasing the refresh threshold value corresponding to the uncorrectable area in order to maintain the performance.

As understood from FIG. 7 and FIG. 8, in the MPU 60, in the read process that executes the track ECC processing compared to the read process that does not execute the track SCC processing, 5 heads HD can increase the number of writes by 100 times or more to reach the same error count, and remaining 13 heads HD can decrease the number of writes to reach the same error count. In other words, as understood from FIG. and FIG. 8, in the read process that executes the track ECC processing compared to the read process that does not execute the track ECC processing, the MPU 60 can set the refresh threshold values of the cylinders of the surfaces of 5 disks DK corresponding to 5 heads ED, respectively, to high refresh threshold values, and can set the refresh threshold values of the above-described cylinders of the surfaces of 13 disks DK corresponding to remaining 13 heads HD, respectively, to low refresh threshold values. In this case, the areal density capability (ADC) can be improved by approximately 0.5%.

Figure 9:
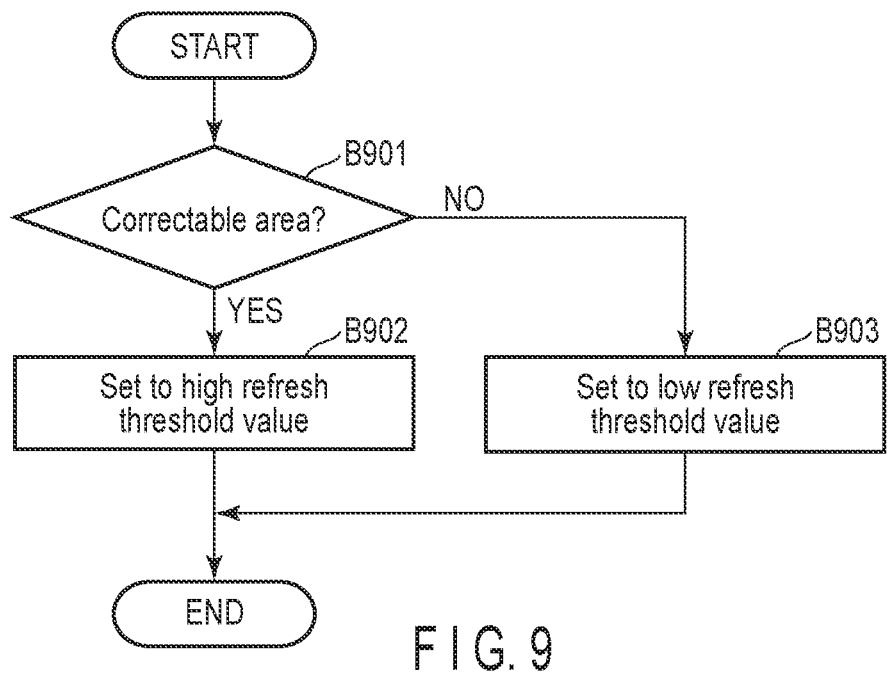
FIG. 9 is a flowchart showing an example of a method of setting a refresh threshold value according to the embodiments.

FIG. 9 is a flowchart showing an example of a method of setting the refresh threshold value according to the embodiments.

The MPU 60 determines whether a particular area is a correctable area or is not a correctable area (B901).

In other words, the MPU 60 determines whether the particular area is a correctable area or an uncorrectable area.

For example, the MPU 60 determines whether the particular track is d correctable track or an uncorrectable track. For example, the MPU 60 determines whether the particular sector is a correctable sector or an uncorrectable sector. When determining that the particular area is a correctable area (YES in B907), the MPU 60 sets the refresh threshold value of this correctable area to a high refresh threshold value (B902) and ends the process. In other words, the MPU 60 sets the refresh threshold value of this correctable track (or this correctable cylinder) to a high refresh threshold value. The MPU 60 sets the refresh threshold value of this correctable sector to a high refresh threshold value.

When determining that the particular area is an uncorrectable area (NO in B901), the MPU 60 sets the refresh threshold value of this uncorrectable area to a low refresh threshold value (B903) and ends the process. In other words, the MPU 60 sets the refresh threshold value of this uncorrectable track (or this uncorrectable cylinder) to a low refresh threshold value. The MPU 60 sets the refresh threshold value of this uncorrectable sector to a low refresh threshold value.

Figure 10:
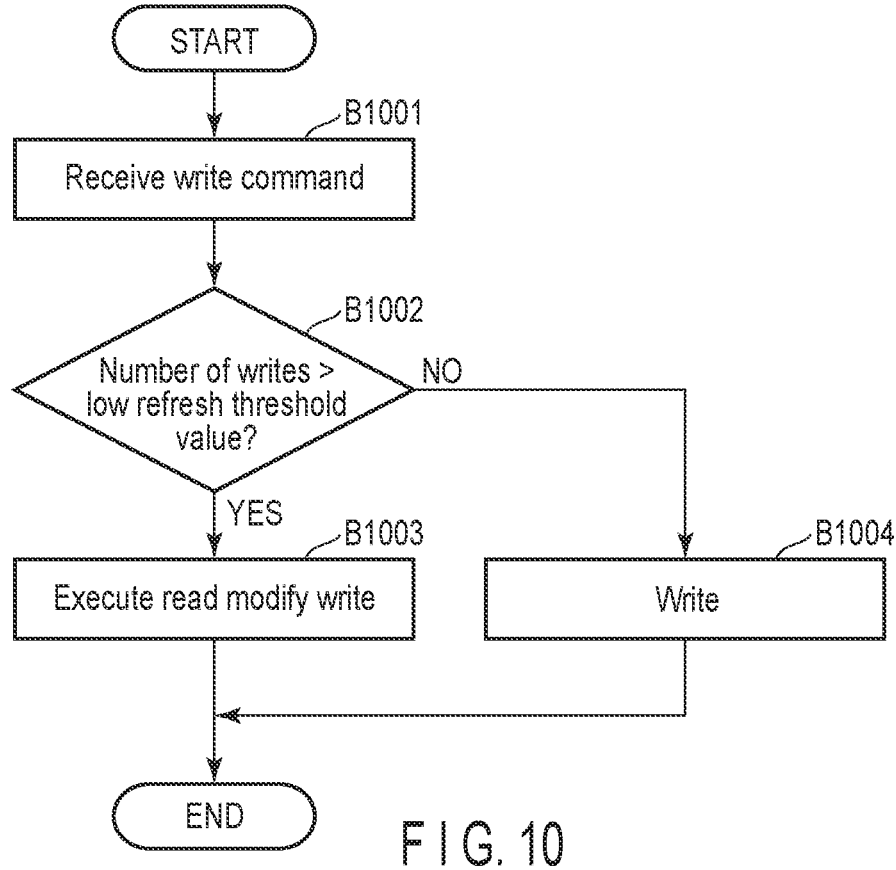
FIG. 10 is a flowchart showing an example of a write process of a correctable area according to the embodiments.

FIG. 10 is a flowchart showing an example of the write process in the correctable area according to the embodiments.

The MPU 60 receives a write command to write the data to the correctable area (B1001). For example, the MPU 60 receives a write command to write the data to the correctable track (or correctable cylinder). The MPU 60 determines whether the number of writes to the correctable area is larger than the low refresh threshold value or smaller than or equal to the low refresh threshold value (B1002). For example, the MPU 60 determines whether the number of writes to the correctable track (or correctable cylinder) is larger than the low refresh threshold value or smaller than or equal to the low refresh threshold value. When determining that the number of writes to the correctable area is less than or equal to the low refresh threshold value (NO in B1002), the MPU 60 writes the data to the correctable area (B1002) and ends the process. For example, when determining that the number of writes is less than or equal to the low refresh threshold value of the correctable track, the MPU 60 writes data to the correctable track and ends the process.

When determining that the number of writes to the correctable area is larger than the low refresh threshold value (YES in B1002), the MPU 60 executes the read modify write (B1003) without allowing the random write to the correctable area, and ends the process. For example, when determining that the number of writes to the correctable track (or correctable cylinder) is larger than the low refresh threshold value, the MPU 60 executes the read modify write without allowing the random write to the correctable track (or correctable (cylinder). For example, when determining that the number of writes to the correctable track (or correctable cylinder) is greater than the low refresh threshold value, the MPU 60 reads the correctable track, writes an update track (or an update cylinder) in which the data instructed to be written by the write command is replaced with the corresponding data of the correctable track (or correctable cylinder), calculates the update parity sector by executing the XOR operation on all the update sector groups of the update track (or update cylinder), writes the update sector groups and the update parity sector to the same track or the same cylinder, and ends the process.

According to the embodiments, the magnetic disk device 1 changes the refresh threshold value corresponding to each cylinder of the surfaces of the plurality of disks DK corresponding to each of the plurality of heads HD. The magnetic disk device 1 has a high refresh threshold value and a low refresh threshold value. The magnetic disk device 1 sets the refresh threshold value of the correctable area to the high refresh threshold value and sets the refresh threshold value of the uncorrectable area to the low refresh threshold value. The magnetic disk device 1 executes the refresh processing on the uncorrectable area set to the low refresh threshold value with a smaller frequency than the frequency of executing the refresh processing on the correctable area set to the high refresh threshold value. When the number of writes to the correctable area is larger than the low refresh threshold value at the time of writing the data to the correctable area, the magnetic disk device executes the read modify write to this correctable area. For this reason, the magnetic disk device 1 can improve the TPI. The recording density of the magnetic disk device 1 can be therefore improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head writing data to the disk and reading data from the disk; and
a controller setting a rewrite threshold value for executing a rewrite process of different tracks in a first sector group including at least one first sector continuous in a circumferential direction of the disk from a first parity sector in which error correction processing in units of tracks is executable based on the first parity sector and including the first parity sector, and a second sector group including at least one second sector continuous in the circumferential direction in which the error correction processing in units of tracks is unexecutable, and rewriting the first sector group and the second sector group with different frequencies,
the controller setting a first rewrite threshold value to the first sector group and setting a second rewrite threshold value smaller than the first rewrite threshold value.

2. The magnetic disk device of claim 1, wherein
the controller executes the rewrite process in the second sector group with a second frequency smaller than a first frequency of executing the rewrite process in the first sector group.

3. The magnetic disk device of claim 1, wherein
when a first number of writes corresponding to the first sector group is larger than the second rewrite threshold value, the controller does not execute random write to the first sector group.

4. The magnetic disk device of claim 3, wherein
when the first number of writes is larger than the second rewrite threshold value and when the controller receives a command to execute random write of first data to the first sector group, the controller reads the first sector group, replaces second data corresponding to the first sector with the first data, calculates a second parity sector by executing an XOR operation on the first data, and writes the first data and the second parity sector to a same track.

5. The magnetic disk device of claim 1, wherein
the first sector group and the second sector group are arranged in a same track.

6. The magnetic disk device of claim 5, wherein
the second sector group corresponds to a sector other than the first sector group in the track.

7. The magnetic disk device of claim 1, wherein
the first sector group is a first track and the second sector group is a second track different from the first track.

8. A magnetic disk device comprising:
a disk having a first surface and a second surface different from the first surface;
a first head writing data to the first surface and reading data from the first surface; and
a second head writing data to the second surface and reading data from the second surface,
the device setting a rewrite threshold value for executing a rewrite process of a track corresponding to a first track of the first surface on which error correction processing in units of tracks is executable, to a first rewrite threshold value, and setting the rewrite threshold value corresponding to the second track of the second surface on which the error correction processing in units of tracks is unexecutable, to a second rewrite threshold value smaller than the first rewrite threshold value.

9. The magnetic disk device of claim 8, wherein
the controller executes the rewrite process in the second track rather than the first track with a higher frequency.

10. The magnetic disk device of claim 9, wherein
when a first number of writes corresponding to the first track is larger than the second rewrite threshold value, the controller does not execute random write to the first track.

11. The magnetic disk device of claim 10, wherein
the controller executes read modify write to the first track.

12. The magnetic disk device of claim 8, wherein
the first track and the second track are same cylinders.

13. A read/write processing method applied to a magnetic disk device comprising a disk and a head writing data to the disk and reading data from the disk, the method comprising:
setting a rewrite threshold value for executing a rewrite process of different tracks in a first sector group including at least one first sector continuous in a circumferential direction of the disk from the first parity sector in which error correction processing in units of tracks is executable based on a first parity sector and including the first parity sector, and a second sector group including at least one second sector continuous in the circumferential direction in which the error correction processing in units of tracks is unexecutable;
rewriting the first sector group and the second sector group with different frequencies;
setting a first rewrite threshold value to the first sector group; and
setting a second rewrite threshold value smaller than the first rewrite threshold value.

14. The read/write processing method of claim 13, further comprising:
executing the rewrite process in the second sector group with a second frequency smaller than a first frequency of executing the rewrite process in the first sector group.

15. The read/write processing method of claim 13, further comprising:
when a first number of writes corresponding to the first sector group is larger than the second rewrite threshold value, not executing random write to the first sector group.

16. The read/write processing method of claim 15, further comprising:
when the first number of writes is larger than the second rewrite threshold value and when the controller receives a command to execute random write of first data to the first sector group, reading the first sector group and replacing second data corresponding to the first sector with the first data;
calculating a second parity sector by executing an XOR operation on the first data; and
writing the first data and the second parity sector to a same track.

17. The read/write processing method of claim 13, wherein
the first sector group and the second sector group are arranged in a same track.

18. The read/write processing method of claim 17, wherein
the second sector group corresponds to a sector other than the first sector group in the track.

* * * * *